United States Patent
Cheng et al.

(10) Patent No.: US 10,196,874 B2
(45) Date of Patent: Feb. 5, 2019

(54) SECONDARY THRUST WIRELINE SHEARING VALVE

(71) Applicant: GE Oil & Gas Pressure Control LP, Houston, TX (US)

(72) Inventors: Samuel Heung Yeung Cheng, Katy, TX (US); Keith Adams, Katy, TX (US); Lloyd Ray Cheatham, Lake Jackson, TX (US); Travis Kyle McEvoy, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 72 days.

(21) Appl. No.: 14/878,593

(22) Filed: Oct. 8, 2015

(65) Prior Publication Data

US 2017/0102088 A1   Apr. 13, 2017

(51) Int. Cl.
*E21B 33/06*    (2006.01)
*F16K 3/02*    (2006.01)
*F16K 31/122*    (2006.01)
*E21B 29/04*    (2006.01)

(52) U.S. Cl.
CPC .......... *E21B 33/063* (2013.01); *E21B 29/04* (2013.01); *F16K 3/0254* (2013.01); *F16K 31/1225* (2013.01)

(58) Field of Classification Search
CPC .. F16K 5/0285; F16K 5/0485; F16K 31/1225; F16K 3/0254; F16K 31/1223; E21B 33/063
USPC ............................ 137/15.11, 315.28; 251/128
See application file for complete search history.

(56) References Cited

U.S. PATENT DOCUMENTS

| | | | | |
|---|---|---|---|---|
| 2,986,367 A * | 5/1961 | Le Rouax | ................ | E21B 33/06 251/1.3 |
| 3,479,004 A * | 11/1969 | Brumm | ................ | F16K 3/0254 251/118 |
| 3,827,668 A * | 8/1974 | De Vries | ................ | E21B 33/06 137/495 |
| 4,029,294 A * | 6/1977 | McCaskill | ................ | F16K 3/36 137/246.12 |
| 4,157,167 A * | 6/1979 | Akkerman | ................ | E21B 34/16 137/102 |
| 4,230,299 A * | 10/1980 | Pierce, Jr. | ................ | E21B 34/02 137/315.28 |
| 4,274,432 A * | 6/1981 | Tunstall | ................ | F16K 3/0254 137/315.28 |

(Continued)

*Primary Examiner* — Mary McManmon
*Assistant Examiner* — Jonathan Waddy
(74) *Attorney, Agent, or Firm* — Hogan Lovells US LLP

(57) ABSTRACT

A bonnet assembly for assisting to move a valve stem to a retracted position includes a bonnet body. The bonnet body has a bonnet valve end selectively connected to a valve, a bonnet actuator end opposite the bonnet valve end selectively connected to a valve actuator. A valve stem extends through the central bore of the bonnet body. A booster piston seal circumscribes the valve stem and engages an inner diameter of the central bore. The booster piston seal selectively defines an extent of a pressure cavity containing pressure media. An effective stem pressure surface faces in a direction towards the valve and is in fluid communication with the valve when the bonnet body is connected to the valve. A booster pressure surface faces in a direction towards the valve when the bonnet body is connected to the valve and is selectively acted on by the pressure media.

15 Claims, 5 Drawing Sheets

(56) References Cited

U.S. PATENT DOCUMENTS

| | | | | |
|---|---|---|---|---|
| 4,349,175 | A | * | 9/1982 | Akkerman .......... F16K 31/1225 |
| | | | | 251/31 |
| 4,372,333 | A | | 2/1983 | Goans |
| 4,394,872 | A | * | 7/1983 | Schobl .................... F16K 41/02 |
| | | | | 137/315.28 |
| 4,540,046 | A | * | 9/1985 | Granger ................. E21B 29/08 |
| | | | | 166/55 |
| 4,925,154 | A | | 5/1990 | Baker |
| 5,732,731 | A | * | 3/1998 | Wafer ................... F16K 41/023 |
| | | | | 137/312 |
| 5,743,288 | A | * | 4/1998 | Mosman ................ F16K 41/02 |
| | | | | 137/315.28 |
| 5,908,046 | A | * | 6/1999 | Mosman ................ F16K 41/02 |
| | | | | 137/312 |
| 6,315,264 | B1 | * | 11/2001 | Baker ................... F16K 31/122 |
| | | | | 251/129.03 |
| 7,481,239 | B2 | * | 1/2009 | McGuire ............... F16K 3/0236 |
| | | | | 137/242 |
| 2003/0034465 | A1 | * | 2/2003 | Adams ............... F15B 15/1433 |
| | | | | 251/14 |
| 2005/0173667 | A1 | * | 8/2005 | Zheng ................... F16K 3/0254 |
| | | | | 251/282 |

* cited by examiner

SECONDARY THRUST WIRELINE SHEARING VALVE

BACKGROUND

1. Field of Disclosure

The present disclosure relates in general to valve bonnets, and more particularly to a bonnet that can assist in closing a valve.

2. Description of Related Art

A gate valve is a valve having a body and a bore through the body. A gate is positioned transverse to the body and moves linearly to obstruct flow through the bore or allow flow through the bore. Gates typically have an aperture that aligns with the bore to allow flow. The gate is sometimes moved, or actuated, by a valve actuator.

The valve actuator can be a pneumatic diaphragm and/or piston, electric, hydraulic or other conventional type actuator that urges a stem downward toward the valve to open the valve. A bonnet can be located between the valve and the valve actuator. The bonnet can be attached to the valve and a valve stem can extend through the bonnet. Over time, valves may develop excessive gate drag, making it impossible for the actuator to move upward and fully close the valve. Silt and debris can become trapped in a valve. In addition, damage at the gate and seat interface and excessive wear can make it difficult or impossible to fully close the valve. There may be times when an actuator does not have enough bonnet stem thrust or spring force to fully close a valve due to changing field conditions.

Also, during oil and gas production, wirelines or tubular members are often lowered through some type of gate valve. Ideally, the wireline or tubular members are removed from the well before the gate valve is closed. However, in some situations wireline or tubular member removal prior to valve closure is not possible and the gate valve is closed on the wireline or tubular member. Some actuators can provide sufficient force to cut wirelines or tubular members. However, not all valves are designed to do so and in an emergency situation, a wireline or tubular member running through the valve may need to be cut to close the valve. The safety of field operations can be jeopardized when a valve is left in a semi-open position because the actuator cannot apply the force required to close the valve completely.

Some current solutions for providing additional closing forces for these circumstances include using double acting actuators or wire cutting actuators. However, these are complicated and costly mechanisms.

SUMMARY OF THE DISCLOSURE

The systems and methods described herein provide a bonnet that includes a bonnet piston for assisting an actuator in moving a valve between the open and closed positions. Embodiments of this disclosure can be used with current standard valves and valve actuators and provide opening and closing forces without increasing the size or weight of some current valve assemblies.

In embodiments of this disclosure, a bonnet assembly for assisting to move a valve stem to a retracted position includes a bonnet body. The bonnet body has a bonnet valve end selectively connected to a valve, a bonnet actuator end opposite the bonnet valve end and selectively connected to a valve actuator, and a central bore extending along a central axis. A valve stem extends through the central bore, the valve stem having a valve stem valve end selectively connected to a valve member. A booster piston seal circumscribes the valve stem and engages an inner diameter of the central bore. The booster piston seal selectively defines an extent of a pressure cavity containing pressure media. An effective stem pressure surface faces in a direction towards the valve and is in fluid communication with the valve when the bonnet body is connected to the valve. A booster pressure surface faces in a direction towards the valve when the bonnet body is connected to the valve and is selectively acted on by the pressure media.

In an alternate embodiment of this disclosure, a bonnet assembly for assisting to move a valve stem to a retracted position includes a bonnet body. The bonnet body has a bonnet valve end selectively connected to a valve, a bonnet actuator end opposite the bonnet valve end selectively connected to a valve actuator, and a central bore extending along a central axis. A valve stem extends through the central bore and has a valve stem valve end and selectively connected to a valve member. The valve stem is moveable between a retracted position where the valve stem valve end is closer to the bonnet valve end and an extended position where the valve stem valve end is farther from the bonnet valve end. A primary piston seal circumscribes the valve stem and has a primary sealing diameter defining an outer diameter of an effective stem pressure surface that faces in a direction towards the valve when the bonnet body is connected to the valve. A booster piston seal circumscribes the valve stem and engages an inner diameter of the central bore, the booster piston seal having a booster sealing diameter that is larger than the primary sealing diameter of the primary piston seal. A booster pressure surface faces in a direction towards the valve when the bonnet body is connected to the valve, the booster pressure surface having a larger surface area than a surface area of the effective stem pressure surface.

In another alternate embodiment of this disclosure, a method for moving a valve stem to a retracted position with a bonnet assembly includes connecting a bonnet valve end of a bonnet assembly to a valve. The bonnet assembly has a bonnet body with a central bore extending along a central axis, and a valve stem of the valve extending through the central bore. A valve stem valve end is connected to a valve member of the valve. The bonnet assembly further includes a booster piston seal circumscribing the valve stem and engaging an inner diameter of the central bore. The booster piston seal selectively defines an extent of a pressure cavity containing a booster pressure media. A bonnet actuator end, that is opposite the bonnet valve end, of the bonnet assembly is connected to a valve actuator. The valve stem is moved from an extended position where the valve stem valve end is farther from the bonnet valve end towards a retracted position where the valve stem valve end is closer to the bonnet valve end, with a valve stem pressure media acting on an effective stem pressure surface of the bonnet assembly that faces in a direction towards the valve and is in fluid communication with the valve. A moving force on the valve stem is boosted with the boosting pressure media acting on a booster pressure surface of the bonnet assembly that faces in a direction towards the valve.

BRIEF DESCRIPTION OF DRAWINGS

So that the manner in which the features, advantages and objects of the disclosure, as well as others which will become apparent, are attained and can be understood in more detail, more particular description of the embodiments briefly summarized above may be had by reference to the embodiment thereof which is illustrated in the appended drawings, which drawings form a part of this specification. It is to be noted, however, that the drawings illustrate only a preferred embodiment of the disclosure and are therefore not to be considered limiting of its scope as the disclosure may admit to other equally effective embodiments.

DETAILED DESCRIPTION OF DISCLOSURE

Figure 1:
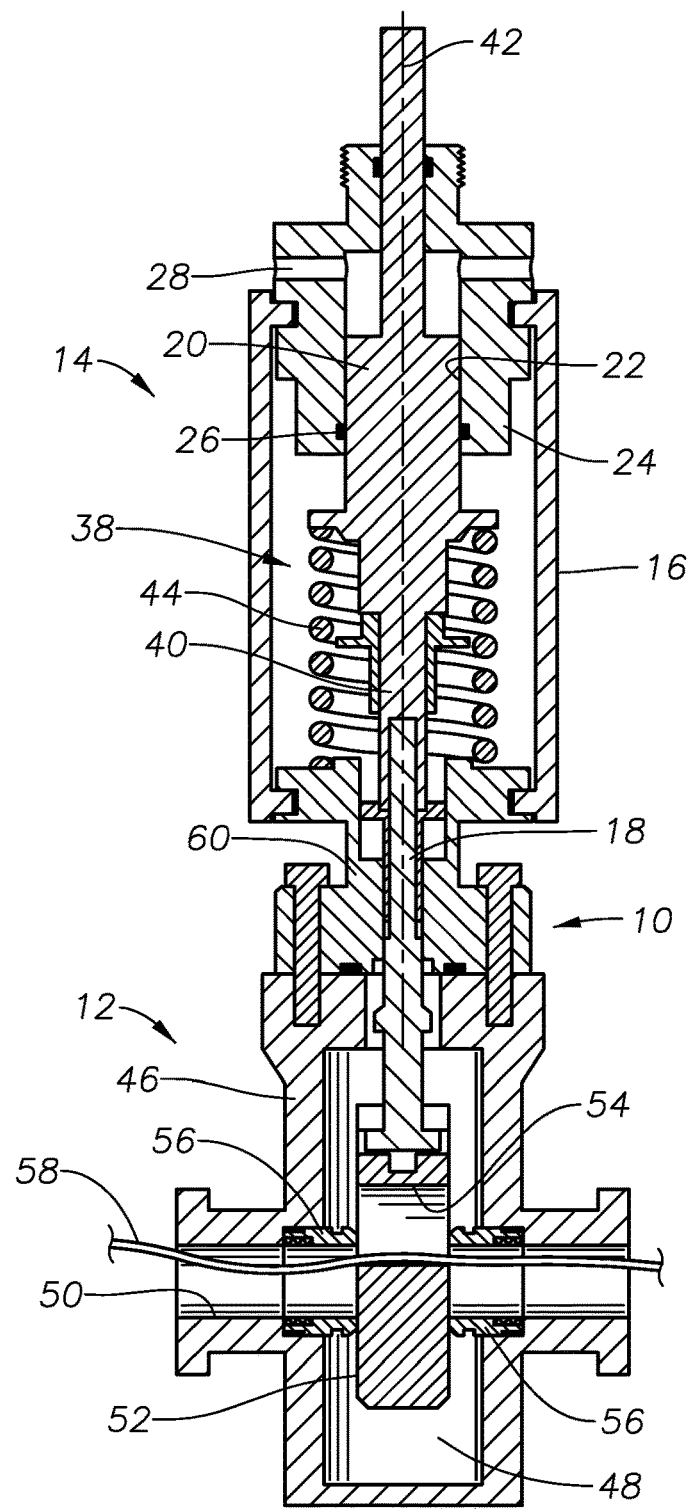
FIG. 1 is a schematic sectional view of a valve in a partially open position with piston assist bonnet in accordance with an embodiment of this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is an example of a piston assist bonnet 10 connected between valve 12 and valve actuator 14. In the embodiment of FIG. 1, valve actuator 14 is a hydraulic piston type actuator for actuating valve 12. Valve 12 can be, as an example, associated with a wellhead assembly that is disposed over a well. The wellhead assembly can include a wellhead housing, a production tree over the housing and flow lines connected to the tree or the wellhead assembly. Valve 12 can be associated with offshore or onshore hydrocarbon drilling and production operations. The flow lines and wellhead assembly can include embodiments of valve 12 described herein. Valve 12 can also be used for regulating fluids that are designated for entry into the wellhead assembly.

Valve actuator 14 includes actuator housing 16. Valve stem 18 extends from within actuator housing 16, through piston assist bonnet 10, and actuates valve 12. Actuator piston 20 mounts within actuator piston chamber 22 of actuator piston head 24. Actuator seals 26 form a seal between an external surface of actuator piston 20 and an inner surface of actuator piston chamber 22. Actuator ports 28 are each apertures radially extending through actuator piston head 24 and are used to introduce pressurized media into actuator piston chamber 22, or for releasing media from actuator piston chamber 22.

Actuator piston 20 has downstop assembly 38 and an actuator stem 40 at its inner end and is connected to valve stem 18 so that movement of actuator piston 20 and actuator stem 40 along axis 42 results in axial movement of valve stem 18. Actuator piston 20 and downstop assembly 38 can be a single member or can be two separate members which are secured together to prevent relative movement between actuator piston 20 and downstop assembly 38 when actuator stem 40 is moved in either direction along axis 42. Spring 44 urges downstop assembly 38 away from valve 12, and therefore also urges valve stem 18 in a direction away from valve 12.

Also shown in FIG. 1 is an example of a valve 12 that could be connected with piston assist bonnet 10. Valve 12 of FIG. 1 is a gate valve with valve body 46 housing chamber 48 therein and passage 50 formed through valve body 46 that intersects chamber 48. Valve member 52 is shown within chamber 48. Valve member 52 is a gate that is a generally planar member having a solid portion and an opening 54 formed through the solid portion. Valve member 52 is selectively slidable within chamber 48. Annular valve seats 56 are shown co-axially disposed in passage 50, each having an end extending into chamber 48. In the embodiment of valve 12 shown in FIG. 1, opening 54 is partially registered with passage 50 and a wire 58 extends through the passage 50 and opening 54. Wire 58 can be, for example, a wireline or a tubular member that extends through valve 12.

In FIG. 1, example valve 12 is a normally closed valve so that when actuator piston 20 is in a position farthest away from valve 12, valve member 52 is in a closed position and blocks passage 50 so that fluids cannot pass from one end of passage 50 to the other end of passage 50 of valve 12. When actuator piston 20 is in a position farthest away from valve 12, valve stem 18 is in a retracted position. Actuator piston 20 can move downward a piston stroke distance. As actuator piston 20 moves downward, valve 12 moves from an upper closed position to a lower open position and valve stem 18 moves to an extended position. In alternate embodiments, valve 12 can be a normal open valve.

Although valve actuator 14 is shown and described herein as a hydraulic piston type actuator, and valve 12 is described as a gate valve, piston assist bonnet 10 can be utilized with any actuator that is directly or indirectly connected to a valve stem of any type of valve that moves axially.

Figure 2:
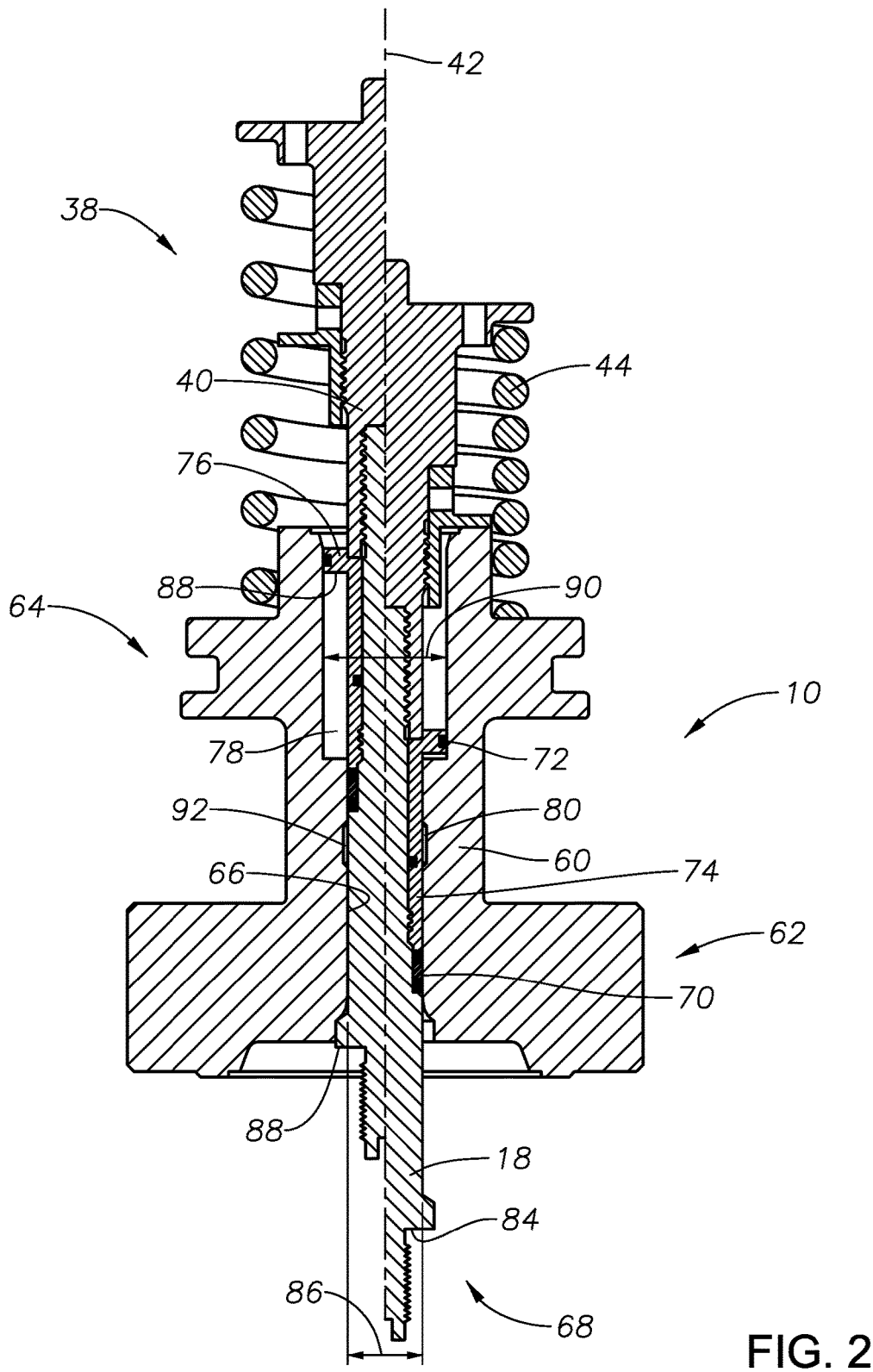
FIG. 2 is a sectional view of a piston assist bonnet, in accordance with an embodiment of this disclosure, with the right side showing a valve stem in the extended position and the left side showing the valve stem in the retracted position.

Looking at FIG. 2, an embodiment of piston assist bonnet 10 is shown in further detail. Piston assist bonnet 10 can be used to assist in moving valve stem 18 to the retracted position. Piston assist bonnet 10 includes bonnet body 60. Bonnet body 60 has bonnet valve end 62 that can be connected to valve 12 (FIG. 1), and bonnet actuator end 64 (FIG. 1) opposite bonnet valve end 62 that can be connected to valve actuator 14 (FIG. 1). Bonnet body 60 has central bore 66 extending along axis 42.

Figure 4:
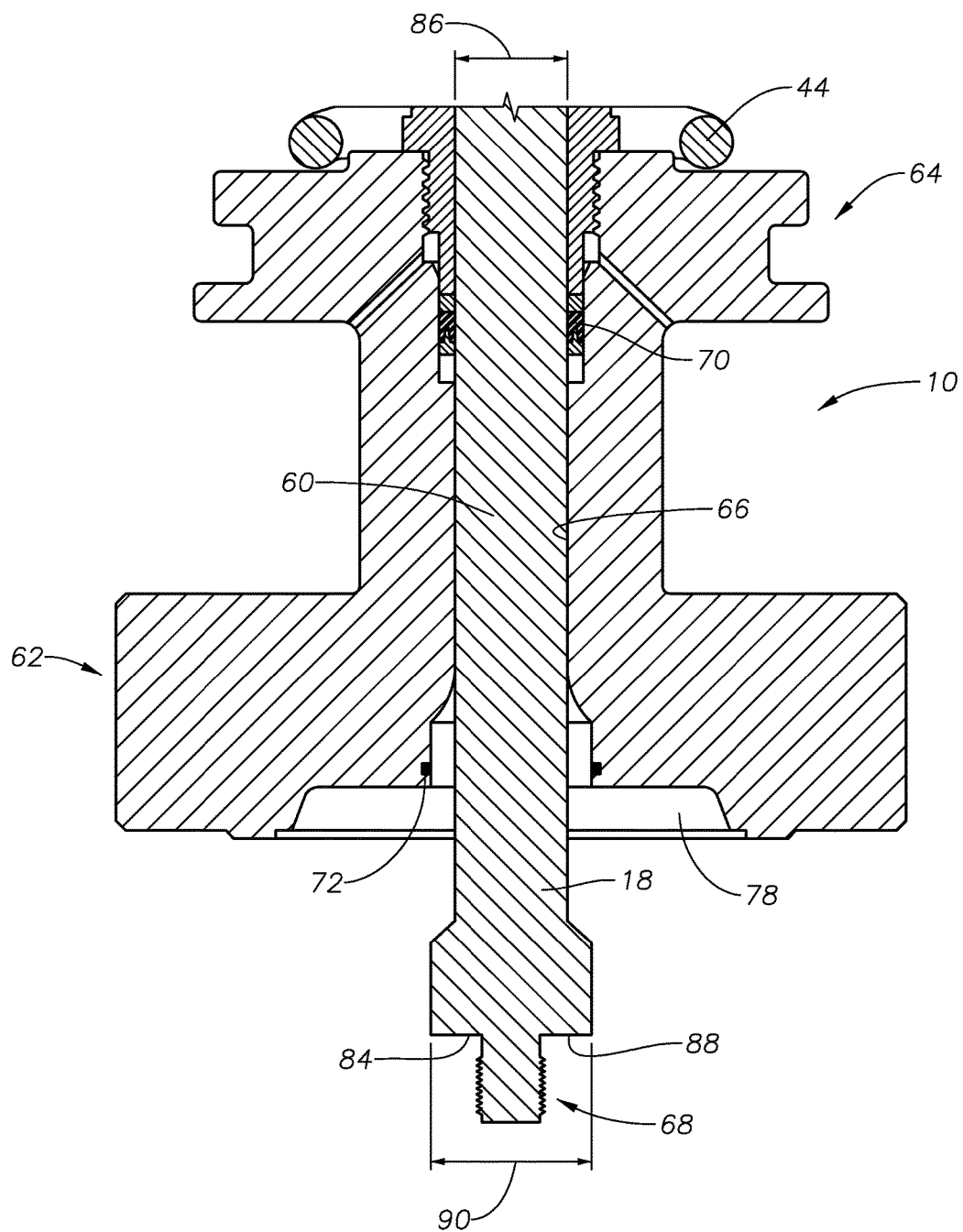
FIG. 4 is a section view of a portion of the piston assist bonnet, in accordance with an embodiment of this disclosure, showing the valve stem in the extended position and with a static primary seal.

Valve stem 18 extends through central bore 66. Valve stem 18 has valve stem valve end 68 for connecting to valve member 52 (FIG. 1). An opposite end of valve stem 18 can be connected to actuator stem 40. Valve stem 18 is moveable between the retracted position where valve stem valve end 68 is closer to bonnet valve end 62 (FIG. 5) and the extended position where valve stem valve end 68 is farther from bonnet valve end 62 (FIG. 4).

Primary piston seal 70 is annular and circumscribes an outer diameter of valve stem 18. Primary piston seal 70 can seal the annular space between an outer diameter of valve stem 18 and an inner diameter of central bore 66. Primary piston seal 70 can operate as a check valve and prevent fluids that are passing through valve 12 (FIG. 1) from reaching valve actuator 14 (FIG. 1), while allowing the return of the fluids back through primary piston seal 70 to valve 12. Such fluids may be, for example, hydraulic fracturing fluids, emergency sealants, descaling solutions, emulsifiers, mud, hydraulic fracturing propent and water. In the example embodiments of FIGS. 2 and 5, primary piston seal is a dynamic seal that moves axially with valve stem 18 and slidingly sealingly engages the inner diameter of central bore 66. In the example embodiment of FIG. 4, primary piston seal is a static seal that is secured to bonnet body 60 and slidingly sealingly engages the outer diameter of valve stem 18.

Booster piston seal 72 (FIG. 2) is also annular and circumscribes an outer diameter of valve stem 18. Booster piston seal 72 can seal the annular space between an outer diameter of valve stem 18 and an inner diameter of central bore 66. Booster piston seal 72 (FIG. 42) can also prevent fluids that are passing through valve 12 (FIG. 1) from reaching valve actuator 14 (FIG. 1). Primary piston seal 70 has a smaller outer diameter than an outer diameter of booster piston seal 72. In the example embodiments of FIGS. 2 and 3, booster piston seal is a dynamic seal that moves axially with valve stem 18 and slidingly sealingly engages the inner diameter of central bore 66. In the example embodiment of FIGS. 4-5, booster piston seal is a static seal that is secured to bonnet body 60 and slidingly sealingly engages the outer diameter of valve stem 18.

Figure 3:
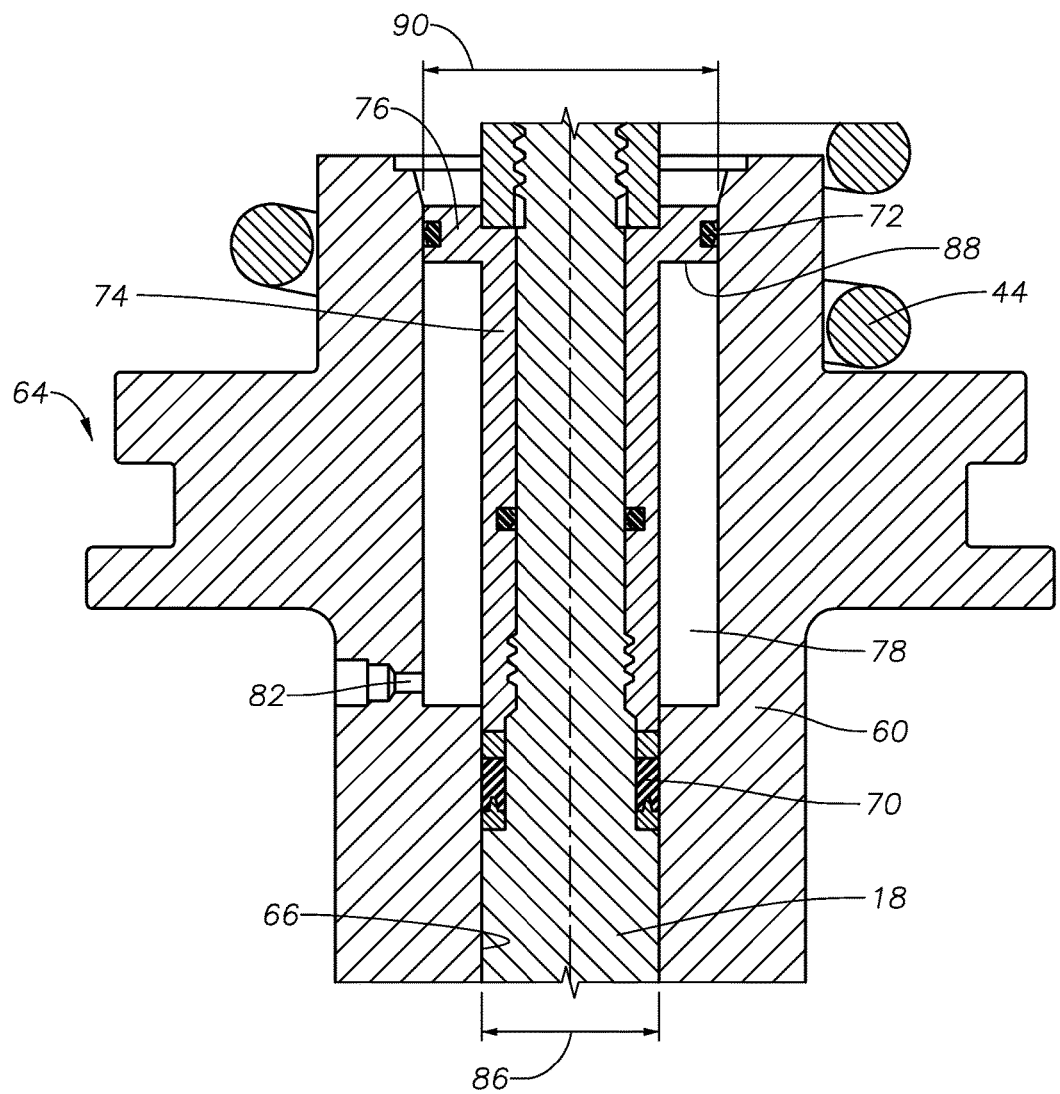
FIG. 3 is a sectional view of a portion of the piston assist bonnet, in accordance with an embodiment of this disclosure, showing the valve stem in the retracted position.

Looking at the example embodiments of FIGS. 2-3, valve stem 18 has booster piston 74. Booster piston 74 circumscribes an elongated body of valve stem 18. Booster piston 74 is shown attached to the body of valve stem 18. In alternate embodiments, booster piston 74 can be integrally formed with valve stem 18. An end of booster piston 74 can act as a retainer to retain primary piston seal 70 in position around valve stem 18. An opposite end of booster piston 74 can have flange 76 that extends radially outward and houses booster piston seal 72. Flange 76 together with booster piston seal 72 can define an extent of pressure cavity 78 that can contain a pressure media. The pressure media can follow internal pressure media path 80 (FIG. 2) by passing by primary piston seal 70, as will be further described herein, to reach pressure cavity 78. Alternately, the pressure media can follow pressure media path 82 (FIG. 3) to reach pressure cavity 78.

During an example of operation of valve 12, fluid that is passing through passage 50 of valve 12 can escape from passage 50 between the faces of valve member 52 and the adjacent faces of valve seats 56 and can come into contact with valve stem 18 by filling chamber 48. This fluid that is passing through passage 50 of valve 12 can be at pressure and therefore can be a pressure media. When this pressure media is acting on valve stem 18 and primary piston seal 70 is preventing the pressure media from reaching valve actuator 14, this pressure media can be known as a valve stem pressure media. As an example, looking at FIGS. 2-4, fluid that is passing through passage 50 of valve 12 can pass through the annular space between the outer diameter of valve stem 18 and the inner diameter of central bore 66 and then be blocked from further travel towards valve actuator 14 by primary piston seal 70. This fluid will be valve stem pressure media and will act on the outer surfaces of valve stem 18 and cause valve stem 18 to act as a piston that will urge valve stem 18 towards valve actuator 14.

Due to the shape of valve stem 18, the sum of the pressure forces acting on valve stem 18 will result in an effective stem pressure surface 84 with a primary sealing diameter 86 that is defined by a primary sealing diameter of primary piston seal 70. Where primary piston seal 70 is a dynamic seal (FIGS. 2, 3, and 5), the primary sealing diameter of primary piston seal 70 will be equal to the inner diameter of central bore 66 where primary piston seal 70 can sealingly engage central bore 66. Where primary piston seal 70 is a static seal (FIG. 4), the primary sealing diameter of primary piston seal 70 will be equal to the outer diameter of valve stem 18 where primary piston seal 70 engages valve stem 18. Effective stem pressure surface 84 is a circular portion of valve stem 18 and faces in a direction towards valve 12. Effective stem pressure surface 84 is therefore static relative to valve stem 18 and axially moveable relative to central bore 66. Because effective stem pressure surface 84 is closer to valve 12 than both primary piston seal 70 and booster piston seal 72, effective stem pressure surface 84 will be in fluid communication with valve 12 when bonnet body 60 is connected to valve 12.

Therefore, both valve actuator 14 as well as the piston effect of valve stem 18, due to the effective stem pressure surface 84, can work together to move valve stem 18 to the retracted position, which in the example embodiment of FIG. 1, will move valve 12 to the closed position. In order to provide additional forces for moving valve stem 18 to the retracted position, piston assist bonnet 10 also includes booster pressure surface 88. The exposure of pressure media to booster pressure surface 88, which is larger than the effective stem pressure surface 84, can provide additional forces for moving valve stem 18 to the refracted position. This can be useful, for example, when cutting wire 58 when closing valve 12. Booster pressure surface 88 can be selectively acted on by the pressure media over a selected portion of travel of valve stem 18 between the extended position and the retracted position. In the example of cutting wire 58, booster pressure surface 88 can be selectively acted on by the pressure media over a selected portion of travel of valve stem 18 corresponding to when gate member 52 is cutting wire 58 against seats 56.

Booster pressure surface 88 faces in a direction towards valve 12 when bonnet body 60 is connected to valve 12. Booster pressure surface 88 is static relative to valve stem 18 and axially moveable relative to central bore 66. The outer diameter of booster pressure surface 88 is defined by a booster sealing diameter 90 of booster piston seal 72. Booster sealing diameter 90 of booster piston seal 72 is larger than the primary sealing diameter of primary piston seal 70 so that in certain embodiments, booster pressure surface 88 has a larger surface area selectively acted on by the pressure media than a surface area of the effective stem pressure surface 84. Where booster piston seal 72 is a dynamic seal (FIGS. 2-3), the booster sealing diameter 90 of booster piston seal 72 will be equal to the inner diameter of central bore 66 where booster piston seal 72 can sealingly engage central bore 66. Where booster piston seal 72 is a static seal (FIGS. 4-5), the booster sealing diameter 90 of booster piston seal 70 will be equal to the outer diameter of valve stem 18 where booster piston seal 72 engages valve stem 18.

In the example embodiment of FIGS. 2-3, booster pressure surface 88 includes flange 76 of booster piston 74 and booster piston seal 72 circumscribes flange 76. In these embodiments, booster piston seal 72 is located separate from primary piston seal 70 closer to bonnet actuator end 64 than primary piston seal 70 is to bonnet actuator end 64, so that when piston assist bonnet 10 is attached to valve actuator 14, booster piston seal 72 is located closer to valve actuator 14 than primary piston seal 70 is to valve actuator 14. In order for the pressure media to reach booster pressure surface 88, internal pressure media path 80 extends from valve 12, through bonnet valve end 62 of piston assist bonnet 10 to pressure cavity 78 for acting on booster pressure surface 88. In such an embodiment, pressure cavity 78 will include a larger diameter portion of the annular space between the outer diameter of valve stem 18 and the inner diameter of central bore 66. Pressure cavity 78 can be defined by primary piston seal 70, booster piston seal 72, booster piston 74, and central bore 66.

Looking at FIG. 2, central bore 66 can have annular recess 92 located in an inner diameter surface of central bore 66. Annular recess 92 has an inner diameter that is greater than primary sealing diameter 86 of primary piston seal 70 so that as primary piston seal 70 passes by annular recess 92, primary piston seal 70 cannot sealingly engage the inner diameter surface of central bore 66. This will allow fluid that is passing through passage 50 of valve 12 to reach pressure cavity 78 and be a booster pressure media acting on booster pressure surface 88. At other times during the travel of valve stem 18 when primary piston seal 70 is not adjacent to annular recess 92, primary piston seal 70 will engage the inner diameter of central bore 66 and can block the pressure media flow path to prevent pressure media, such as fluids that are passing through valve 12, from passing by primary piston seal 70 to booster pressure surface 88.

Looking at FIG. 3, in addition to internal pressure media path 80 or as an alternate to internal pressure media path 80, external pressure media path 82 can provide a pressure media flow path to booster pressure surface 88 from an outer diameter of bonnet body 60. An external pressure media system that includes a pressure media reservoir, an external accumulator bladder, and a pump can be associated with external pressure media path 82. In such an embodiment, booster pressure media can include a separate fluid from the fluid that is passing through passage 50 of valve 12. Such fluid can be for example, a hydraulic fluid, pressurized air, or other forms of liquids and gasses known in the art. In examples using external pressure media path 82, the booster sealing diameter 90 of booster piston seal 72 may not be larger than primary sealing diameter 86 of primary piston seal 70. Instead, the pressure of the pressure media injected through external pressure media path 82 may be increased to provide the required additional force on booster pressure surface 88 to generate the additional desired forces to move valve stem 18 between the extended and retracted positions.

The pressure media can be timed, as an example, to be injected through external pressure media path 82 to coincide with when extra closing forces are required for valve member 52 to cut wire 58. In alternate examples pressure media can be injected through external pressure media path 82 at other times when valve 12 is stuck or it is desired that valve 12 close more quickly than can be accomplished with valve actuator 14 and the piston effect of valve stem 18 due to the effective stem pressure surface 84.

Figure 5:
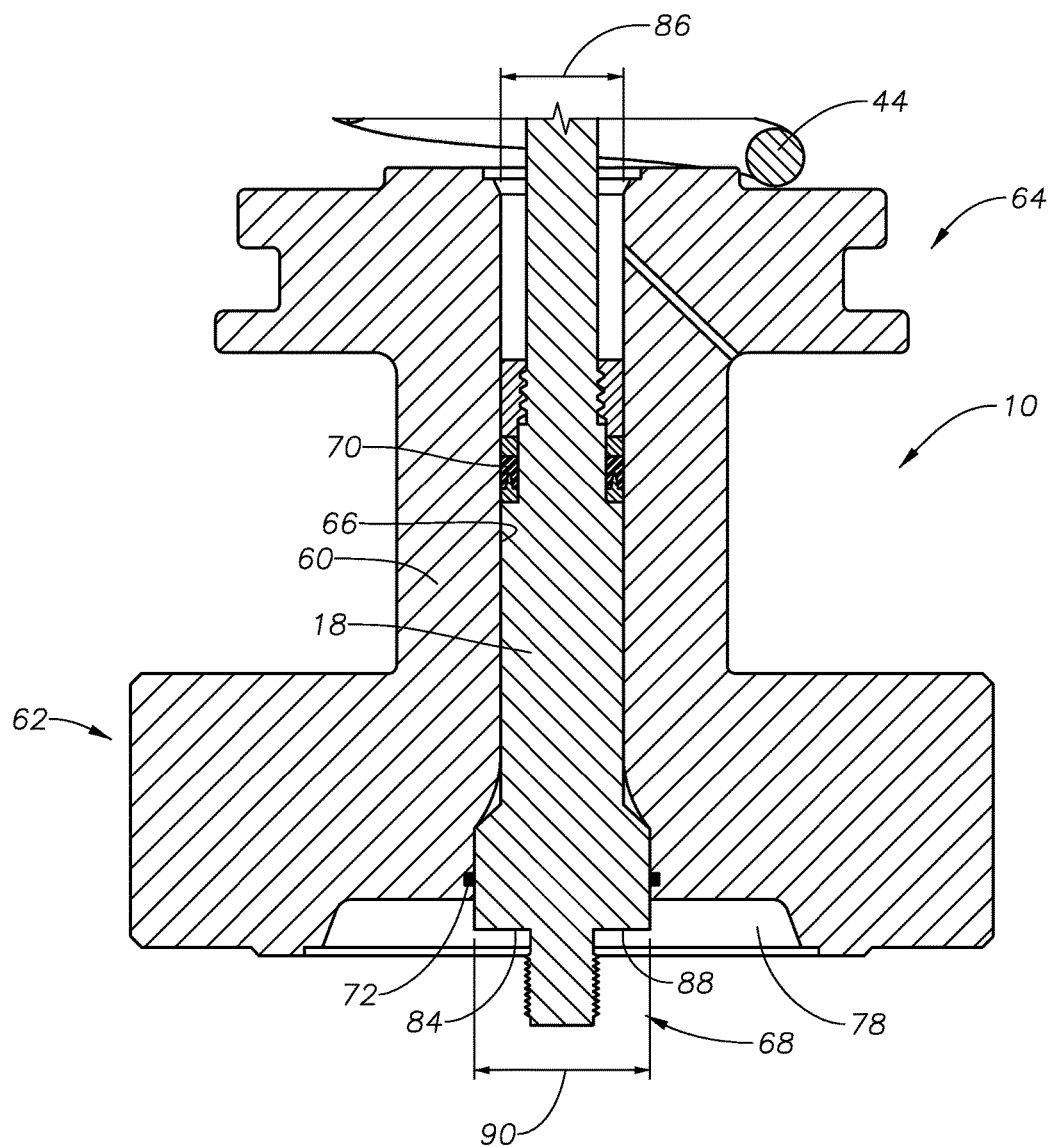
FIG. 5 is a section view of a portion of the piston assist bonnet, in accordance with an embodiment of this disclosure, showing the valve stem in the retracted position and with a dynamic primary seal.

Looking at FIGS. 4-5, in addition to or as an alternate of booster pressure surface 88 being flange 76 of booster piston 74 and booster piston seal 72 circumscribing flange 76, booster piston seal 72 can instead be located on a side of primary piston seal 70 closer to bonnet valve end 62. In such an embodiment, as valve stem 18 moves to the retracted position, an enlarged diameter portion of valve stem 18 will engage booster piston seal 72. When booster piston seal 72 seals between the outer diameter of valve stem 18 and the inner diameter of central bore 66, the fluids passing through passage 50 of valve 12 that provide pressure within pressure cavity 78 will cause a net force on valve stem 18 that results in booster pressure surface 88 including the face of valve stem 18 with a larger outer diameter than the effective stem pressure surface 84. In such an embodiment, pressure cavity 78 includes a space between bonnet valve end 62 and valve 12, as well as chamber 48 and booster pressure media includes fluids passing through passage 50. The placement of booster piston seal 72 in such an embodiment can be selected so that booster piston seal 72 engages the outer diameter surface of valve stem 18 during the closing of valve 12 when extra closing forces are required for valve member 52 to cut wire 58.

In addition to providing additional moving forces to assist in moving valve stem 18 from an extended position to a retracted position, piston assist bonnet 10 can also assist in more smoothly moving valve stem 18 from a retracted position to an extended position by reducing the tendency of valve 12 to undergo a variety of forces as valve 12 is moved to the open position. Booster pressure surface 88 can be acted on by the boosting pressure media over a selected portion of travel of valve stem 18 between the extended position and the retracted position so that other forces that affect the opening and closing of valve member 52 can be negated, such as, for example, gate drag and surges as opening 54 first registers with or no longer registers with passage 50.

The systems and methods described herein have significant advantages. It is desirable to be able to use a simple actuator, such as a mechanical single acting fail safe close actuator, for normal oil and gas drilling and production operations rather than using a costly wire cutting actuator. Embodiments of this disclosure allow the simpler actuator to be used and then piston assist bonnet 10 of this disclosure can be attached between valve 12 and valve actuator 14, as described herein to assist the valve stem 18 in moving between the extended and retracted position, without adding to the overall height or weight of the overall valve assembly.

The terms "vertical", "horizontal", "upward", "downward", "top", and "bottom" are used herein only for convenience because valve 12 may be installed in various positions, other than with the valve stem 18 pointing upward.

Systems and methods disclosed here are therefore well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of this disclosure and the scope of the appended claims.

What is claimed is:

1. A bonnet assembly for assisting movement of a valve stem to a retracted position, the bonnet assembly comprising:
   a bonnet body, the bonnet body having a bonnet valve end selectively connected to a valve, a bonnet actuator end opposite the bonnet valve end selectively connected to a valve actuator, and a central bore extending along a central axis;
   the valve stem extending through the central bore, the valve stem having a valve stem valve end selectively connected to a valve member;

a booster piston seal circumscribing the valve stem and engaging an inner diameter of the central bore, the booster piston seal selectively defining an extent of a pressure cavity containing pressure media, and a flow of the pressure media into the pressure cavity being blocked by a primary piston seal circumscribing the valve stem until the valve is at an intermediate position between the retracted position and an extended position;

an effective stem pressure surface facing in a direction towards the valve and in fluid communication with the valve when the bonnet body is connected to the valve;

a booster pressure surface facing in the direction towards the valve when the bonnet body is connected to the valve, the booster pressure surface selectively acted on by the pressure media to drive axial movement of the valve stem; and a pressure media flow path to the booster pressure surface from an outer diameter of the bonnet body.

2. The bonnet assembly according to claim 1, wherein the primary piston seal has a smaller outer diameter than an outer diameter of the booster piston seal.

3. The bonnet assembly according to claim 1, further comprising another pressure media flow path to the booster pressure surface from the bonnet valve end of the bonnet body.

4. The bonnet assembly according to claim 3, wherein the primary piston seal selectively blocks the pressure media flow path to the booster pressure surface from the bonnet valve end of the bonnet body.

5. The bonnet assembly according to claim 1, further comprising an annular recess in the central bore, the annular recess having an inner diameter that is greater than a primary sealing diameter of the primary piston seal circumscribing the valve stem.

6. The bonnet assembly according to claim 1, wherein the booster piston seal is a dynamic piston seal that slidingly sealingly engages the inner diameter of the central bore.

7. The bonnet assembly according to claim 1, wherein the valve stem is moveable between the extended position where the valve stem valve end is farther from the bonnet valve end and the retracted position where the valve stem valve end is closer to the bonnet valve end, and wherein the booster pressure surface is acted on by the pressure media over a selected portion of travel of the valve stem between the extended position and the retracted position.

8. The bonnet assembly according to claim 1, wherein the effective stem pressure surface and the booster pressure surface are both static relative to the valve stem and axially moveable relative to the central bore.

9. The bonnet assembly according to claim 1, wherein the booster pressure surface has a larger surface area selectively acted on by the pressure media than a surface area of the effective stem pressure surface.

10. A bonnet assembly for assisting to move a valve stem to a retracted position, the bonnet assembly comprising:

a bonnet body, the bonnet body having a bonnet valve end selectively connected to a valve, a bonnet actuator end opposite the bonnet valve end selectively connected to a valve actuator, and a central bore extending along a central axis;

the valve stem extending through the central bore having a valve stem valve end selectively connected to a valve member, the valve stem being moveable between the retracted position where the valve stem valve end is closer to the bonnet valve end and an extended position where the valve stem valve end is farther from the bonnet valve end;

a primary piston seal circumscribing the valve stem and having a primary sealing diameter defining an outer diameter of an effective stem pressure surface that faces in a direction towards the valve when the bonnet body is connected to the valve;

an annular recess having an inner diameter greater than an inner diameter of the central bore, the annular recess arranged about the valve stem such that the primary piston seal does not contact the inner diameter of the annular recess when the primary piston seal is radially aligned with the annular recess;

a booster piston seal circumscribing the valve stem and engaging the inner diameter of the central bore, the booster piston seal having a booster sealing diameter that is larger than the primary sealing diameter of the primary piston seal; and a booster pressure surface facing in the direction towards the valve when the bonnet body is connected to the valve, the booster pressure surface having a larger surface area than a surface area of the effective stem pressure surface.

11. The bonnet assembly according to claim 10, further comprising a pressure media flow path extending to the booster pressure surface from one of the bonnet valve end and an outer diameter of the bonnet body.

12. The bonnet assembly according to claim 10, wherein the primary piston seal is a dynamic seal that slidingly sealingly engages the inner diameter of the central bore.

13. The bonnet assembly according to claim 10, wherein the effective stem pressure surface is in fluid communication with the valve when the bonnet assembly is connected to the valve.

14. The bonnet assembly according to claim 10, wherein the annular recess has the inner diameter that is greater than the primary sealing diameter of the primary piston seal.

15. The bonnet assembly according to claim 10, wherein the booster pressure surface is axially static relative to the valve stem and axially moveable relative to the central bore.

\* \* \* \* \*